April 17, 1962  A. S. JOHNSON, JR  3,030,089
METHOD AND APPARATUS FOR HEATING SOLID PARTICLES
Filed Jan. 16, 1959
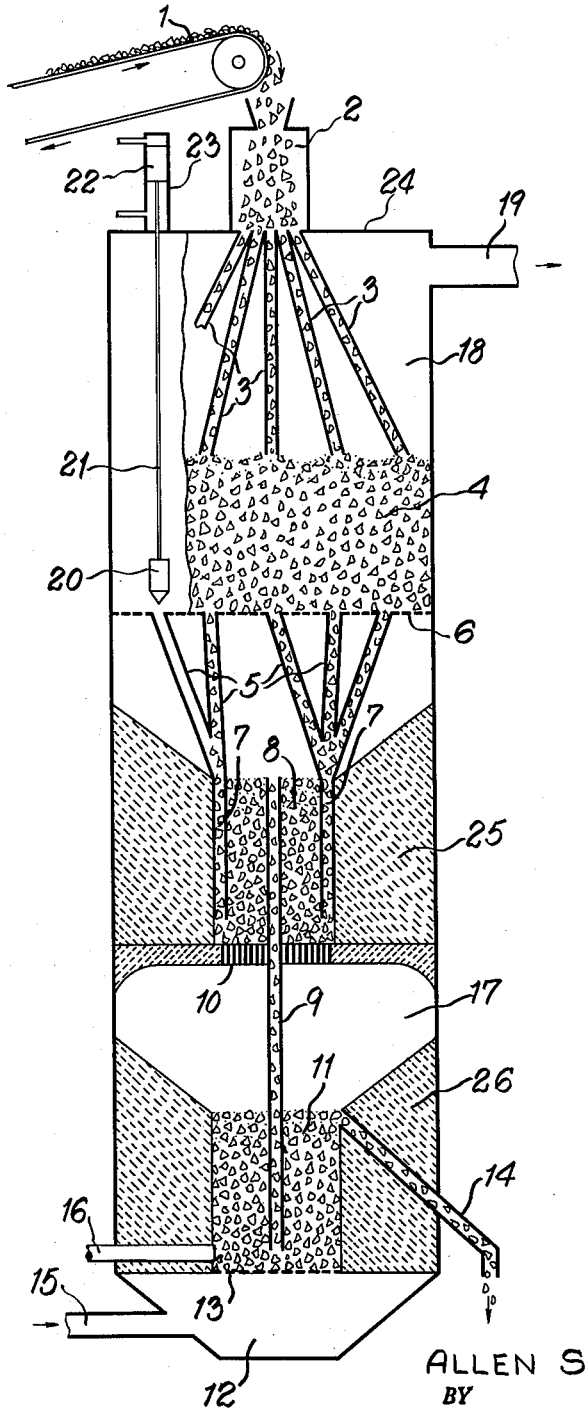
INVENTOR.
ALLEN S. JOHNSON, Jr.
BY
Benj. T. Rauber
ATTORNEY

United States Patent Office 3,030,089
Patented Apr. 17, 1962

3,030,089
METHOD AND APPARATUS FOR HEATING SOLID PARTICLES
Allen S. Johnson, Jr., Salisbury, N.C., assignor to Carolina Tuff-Lite Corporation, Salisbury, N.C., a corporation of North Carolina
Filed Jan. 16, 1959, Ser. No. 787,298
5 Claims. (Cl. 263—21)

My invention relates to improvements in heating solid particles, more particularly, heating said particles in buoyant suspension in an upwardly flowing gaseous medium.

In a system of the above type the weight of the solids is balanced by the upward force of the flowing fluid, such as hot gas, so that the solids flow in much the same manner as a body of liquid. The gases flow at a greater speed than that of the mass of solid particles so that they come recurrently into direct, intimate, contact with the particles and rapidly transmit their heat to them. When the particles reach an overflow level they flow out of the gas stream.

To obtain the most efficient handling and heating, the particles may be heated in successive stages, particles being fed from upper to lower stages while the heating and buoying gases flow counter current, upwardly, successively from a lower stage to the next higher one. To avoid an excessively high pressure drop of the gases required for a large number of buoying states, the highest stage at which the unheated particles enter into contact with the gases may be one in which the particles are not buoyed and through which the gases pass more slowly and with a lower pressure drop through a bed of the initially unheated particles.

The particles are supplied evenly to the top of this uppermost bed and from equally spaced passes in its bottom are supplied to the next lower stage, thus maintaining an even depth of the particles. The particles passing from this initial stage pass to the bottom of the next lower one, then overflow and pass to the bottom of the next lower. If the heated particles are to be used at the temperature at which they overflow from the lowest stage, they pass out of the heating cycle. The particles may pass from a higher to a lower stage through conduits passing through the current of gases and through the stages or to one side of the stages.

The velocity of the gas stream may be slowed between successive stages by widening the area of the passage between one particle stage and the next higher one. This is of particular advantage between the lowermost stage and the next higher one when combustion of the heating gases takes place in the lowermost stage in order to provide ample time to complete the combustion of the gases. It is of advantage between the uppermost, relatively quiescent bed and the next lower stage to obtain an even distribution of the gases to the uppermost bed.

In apparatus for practicing the above method, a container is provided with various enclosures, namely, an upper heating enclosure in which the particles undergoing treatment are heated to a temperature above the ignition temperature of the heating fuel, a lower heating enclosure in which the particles are heated to a final temperature and an intermediate enclosure between the upper and lower heating enclosures of a larger area in a plane transverse to the direction of movement of gases from the lower to the upper heating enclosures. Fuel is burned in the lower enclosure to bring the particles to and maintain them at the final temperature. The mixture of air and burning fuel passes from the lower enclosure into the intermediate enclosure in which the velocity of the burning gases is reduced by the increased area transverse to their direction of travel to enable the combustion of the fuel to be completed. The products of combustion then pass into the upper heating in which particles are heated for introduction into the lower heating enclosure.

To economize on the fuel consumption, a second enclosure is provided above the upper heating enclosure to receive products of combustion from the upper enclosure and permit their temperature to equalize and a preheating enclosure above the second enclosure into which the products of combustion pass to contact and preheat a supply of particles to be heated in the heating enclosures. Foraminous floors are provided for the heating and preheating enclosures through which buoying air and products of combustion pass upwardly into the successive enclosures. Particles pass downwardly from the preheating enclosure into the upper heating enclosure and from the latter to the lower heating enclosure, the particles heated to the final temperature overflowing through an overflow pipe.

The various features are shown by way of example in the accompanying drawings which show a vertical section through apparatus of the invention.

In the embodiment of the invention shown in the drawing, the solid particles are fed by a feed conveyor 1 to a hopper 2 from the bottom of which they are distributed by pipes 3 to evenly spaced outlets terminating at a common level in the preheating enclosure containing the first or uppermost stage 4 of the apparatus. From the bottom of the stage 4 the initially heated particles pass through branch pipes 5 opening from the perforated or foraminous bottom 6 of the uppermost stage. The branch pipes 5 lead from equally spaced intervals in the area of the bottom 6 to provide a uniform withdrawal of the particles from the stage 4 and thus to maintain evenness in the height of the stage 4 and a uniform movement of the particles downwardly in this stage. The branch pipes 5 merge into one or more downtake pipes 7 which deliver near the bottom of the upper heating enclosure enclosing the next lower stage. In this stage the particles are heated to a higher temperature and are buoyed upwardly to the upper end of a downtake pipe 9 which extends downwardly through a foraminous bottom 10 of the stage 8 to the bottom of a lower enclosure enclosing a lowermost stage 11. The particles delivered to the bottom of the stage 11 come into contact with gases at the highest temperature in the method or with gases undergoing combustion. These heating gases or air and fluid fuel such, for example, as fuel gas or liquid fuel, preferably gas fuel, admitted from a distribution chamber 12 through a foraminous bottom 13 and pass upwardly, heating and buoying the particles in this stage. After reaching an overflow level the particles overflow into an outlet pipe or chute 14.

In the intermediate stage 8 the particles may be heated to a temperature above the ignition temperature of the fuel to be used for heating as, for example, a temperature of 1000° F. or somewhat above, and are delivered at this temperature to the bottom of the lowermost stage 11 so that a mixture of fuel and air admitted to this stage will burn and heat the particles passing upwardly therethrough.

In the embodiment shown in the drawing, the particles are heated in the enclosure of the lower heating stage by the combustion of fuel directly while passing upwardly with air for combustion. For this purpose air is admitted through an inlet pipe 15 to the distribution chamber 12 and fuel is admitted through a fuel pipe 16 directly into the lower enclosure of stage 11 above the bottom 13 or by any suitable means to mix with the air. The air may be preheated if that is found desirable. The air passes through the bottom 13 upwardly into the stage 11, mixes with the fuel and the mixture is ignited and passes upwardly therethrough into an intermediate enclosure forming an expansion chamber 17. In the expansion chamber 17 the velocity of the burning fuel is slowed to provide ample time to complete combustion and then passes through the foraminous bottom 10 to the upper heating enclosure enclosing the stage 8 and resuming its velocity passes upwardly through this stage heating the particles and buoying them to the overflow pipe 9. Upon passing upwardly out of the stage 8 the gases again expand in an enclosure between the upper heating stage and the preheating stage to the area of the bottom 6 and pass through this bottom into the relatively quiet bed 4 and pass at a reduced speed through this bed. Having passed through this bed they enter an offtake space 18 and pass out through an outlet 19 at a temperature as low as it is practicable to cool them in passing through the upper part of the bed in contact with particles at atmospheric temperature.

The passage of the particles from the stage or bed 4 into the pipes 5 may be regulated by any suitable means. In the embodiment shown in the drawing this is done by means of dampers or plugs 20, one for each pipe 5 suspended individually by rods 21 passing upwardly through the stage 4 and off-take space 18 to a hydraulically operated piston 22 in a cylinder 23 on the top or cover 24 of the off-take space 18. The plugs are lifted and lowered for the several pipes successively for equal intervals to effect equal withdrawal throughout the area of the bed and the timing of the intervals is controlled by the level of the particles in the lowermost stage 11. When the level of the particles in this stage falls below the overflow level the timing is speeded up until the overflow level is reached. The pressure in the expansion space 17 rises as the level of the particles falls and this pressure may be measured and used as an automatic control by means known in the art. It is therefore not illustrated in the drawing. It may also be used to control the feed of the feeding conveyor 1. The control plug 20 and actuating means has been illustrated for only one pipe 5 and, for clearness of illustration, the particles about and above the plug are not shown. It will be understood that there is one such plug for each of the pipes 5 and that they are covered by the particles in the bed.

The apparatus may be made of any suitable material. As indicated, the stages 8 and 11 are enclosed by refractory material 25 and 26, respectively, and the bottom 10 may also be of refractory. The bottom 13 may be of steel as it is in contact with the cool air and gas in the chamber 12.

The method and apparatus may be used for various solids such, for example, as rocks or ores to be heat treated and for particles of a size up to about one and one-half inches in diameter or in average dimensions. They may be used, for example, in preheating shales or similar rocks to be heated to high temperatures to expand them for expanded concrete aggregates. In such case the rock particles may be heated to a final temperature of about 2000° F. in the final or lowermost stage 11 and then transferred through the overflow 14 to apparatus for final treatment at a higher temperature.

For buoying shale rock particles of a size of one and one-half inches a velocity of about twenty-five feet per second will be sufficient in the stages 8 and 11 and this need not require an initial pressure above that supplied by a two-stage blower.

Having described my invention, I claim:

1. A method of heating solid particles which comprises feeding said particles to the bottom of an upper stage, heating and buoying said particles in said stage to an overflow level, feeding said particles from said overflow level to the bottom of a lower stage, heating and buoying said particles in said lower stage to an overflow level, passing heating gases successively through said lower and said upper stage to heat and buoy said particles, decreasing the velocity of said gas between said lower and said upper stage and preheating said particles by passing gases from said upper stage through a bed of said particles and feeding particles from the bottom of said bed to the bottom of said upper stage, and in which the velocity of said gas is decreased by widening the path of said gas between said stages.

2. Apparatus for heating solid particles which comprises an upper enclosure having a foraminous bottom, a lower enclosure below said upper enclosure and having a foraminous bottom and an intermediate enclosure between said upper enclosure and said lower enclosure and of greater horizontal section area than that of said lower enclosure, means for passing heating and buoying gases upwardly in succession through said lower enclosure, said intermediate enclosure and said upper enclosure, means for supplying solid particles to the bottom of said upper enclosure and from the top of said upper enclosure to the bottom of said lower enclosure and from the top of said lower enclosure and an enclosure of larger diameter than that of said upper enclosure above said upper enclosure, a preheating enclosure above said last enclosure and having a foraminous bottom to receive gases from said last enclosure, means to feed particles to said preheating enclosure and means to feed particles from the bottom of said preheating enclosure to the bottom of said upper enclosure.

3. The apparatus of claim 2 in which the means to feed particles from the bottom of said preheating chamber to the bottom of said upper enclosure comprises pipes opening from the bottom of said preheating enclosure at spaced intervals and leading to the bottom of said upper enclosure.

4. The apparatus of claim 3 having means to control the passage of particles to said pipes.

5. The apparatus of claim 4 in which said means to control the passage of particles to said pipes comprises plugs movable vertically in said preheating enclosure above said pipes.

References Cited in the file of this patent

UNITED STATES PATENTS

| | | |
|---|---|---|
| 2,503,788 | White | Apr. 11, 1950 |
| 2,548,642 | White | Apr. 10, 1951 |
| 2,668,041 | Knibbs | Feb. 2, 1954 |
| 2,684,840 | Behme et al. | July 27, 1954 |
| 2,734,805 | Savage et al. | Feb. 14, 1956 |